(12) United States Patent
Chen et al.

(10) Patent No.: US 11,774,790 B2
(45) Date of Patent: Oct. 3, 2023

(54) DISPLAY PANEL AND DISPLAY DEVICE

(71) Applicants: Beijing BOE Display Technology Co., Ltd., Beijing (CN); BOE Technology Group Co., Ltd., Beijing (CN)

(72) Inventors: Yifu Chen, Beijing (CN); Seungmin Lee, Beijing (CN); Yanping Liao, Beijing (CN); Lei Guo, Beijing (CN); Yingying Qu, Beijing (CN); Zhe Li, Beijing (CN); Liangliang Jiang, Beijing (CN); Lifeng Lin, Beijing (CN); Lan Xin, Beijing (CN); Zhihua Sun, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/846,074

(22) Filed: Jun. 22, 2022

(65) Prior Publication Data
US 2022/0326563 A1    Oct. 13, 2022

Related U.S. Application Data

(63) Continuation of application No. 16/959,286, filed as application No. PCT/CN2019/101636 on Aug. 20, 2019.

(51) Int. Cl.
G02F 1/1333 (2006.01)
G02F 1/1335 (2006.01)
G02F 1/13357 (2006.01)
G02F 1/1339 (2006.01)

(52) U.S. Cl.
CPC ...... *G02F 1/133308* (2013.01); *G02F 1/1339* (2013.01); *G02F 1/133514* (2013.01); *G02F 1/133602* (2013.01)

(58) Field of Classification Search
CPC ................................................ G02F 1/133308
See application file for complete search history.

(56) References Cited

U.S. PATENT DOCUMENTS 6,348,958 B1 * 2/2002 Matsuoka ......... G02F 1/133514
430/7
2003/0137631 A1 7/2003 Nakayoshi et al.
(Continued)

FOREIGN PATENT DOCUMENTS

CN  1601345 A    3/2005
CN  103149729 A  6/2013
(Continued)

OTHER PUBLICATIONS

Office Action for corresponding Chinese Application No. 201980001399.6 dated Sep. 28, 2021.
(Continued)

*Primary Examiner* — Edmond C Lau
(74) *Attorney, Agent, or Firm* — ArentFox Schiff LLP; Michael Fainberg

(57) ABSTRACT

Embodiments of the present disclosure provide a display panel and a display device. The display panel includes: a first substrate; at least one underlaying structure, arranged on the first substrate and in a non-display region of at least one side of a display region of the display panel; and at least one supporting structure, arranged on one side, facing away from the first substrate, of the at least one underlaying structure, where an orthographic projection of the supporting structure on the first substrate is within a range of an orthographic projection of the underlaying structure on the first substrate.

14 Claims, 9 Drawing Sheets

(56) References Cited

U.S. PATENT DOCUMENTS

| | | | |
|---|---|---|---|
| 2010/0188606 A1* | 7/2010 | Wang | G02F 1/133609 |
| | | | 349/71 |
| 2013/0250227 A1 | 9/2013 | Kira et al. | |
| 2014/0022478 A1 | 1/2014 | Kim | |
| 2017/0053949 A1 | 2/2017 | Shin et al. | |
| 2017/0082885 A1 | 3/2017 | Lee | |
| 2018/0031889 A1* | 2/2018 | Kim | G02F 1/1339 |
| 2018/0321536 A1* | 11/2018 | Hu | G02F 1/133514 |
| 2020/0004063 A1* | 1/2020 | Higashiyama | G02F 1/133351 |

FOREIGN PATENT DOCUMENTS

| | | |
|---|---|---|
| CN | 103969883 A | 8/2014 |
| CN | 106200095 A | 12/2016 |
| CN | 107942579 A | 4/2018 |
| JP | H-086006 A | 1/1996 |
| JP | H-1062768 A | 3/1998 |
| JP | 2003215599 A | 7/2003 |
| KR | 1020170044327 A | 4/2017 |

OTHER PUBLICATIONS

International Search Report for PCT/2019/101636 dated May 9, 2020.
Notice of Allowance for corresponding U.S. Appl. No. 16/959,286 dated Apr. 20, 2022.
Office Action for corresponding U.S. Appl. No. 16/959,286 dated Feb. 2, 2022.
Japanese Office Action for 2019-5613900 dated Jun. 6, 2023.

* cited by examiner

DISPLAY PANEL AND DISPLAY DEVICE

The application is a continuation of U.S. patent application Ser. No. 16/959,286, filed on Jun. 30, 2020, which is a US National Stage of International Application No. PCT/CN2019/101636, filed on Aug. 20, 2019, and entitled "DISPLAY PANEL AND DISPLAY DEVICE". The afore-mentioned patent applications are hereby incorporated by reference in their entireties.

FIELD

The present disclosure relates to the technical field of display, in particular to a display panel and a display device.

BACKGROUND

After development in recent decades, the technology and process of a liquid crystal display (LCD) increasingly mature, and the LCD has replaced a cold cathode fluorescent lamp (CCFL) display to become a mainstream product in the field of display.

When the LCD is manufactured in an integrated modularization manner, a frame needs to be additionally installed on a peripheral non-display region, or double-faced foam adhesive tape needs to be pasted under the non-display region, thereby fixing a liquid crystal display panel to a back plate frame of a whole display.

However, the frame or the double-faced foam adhesive tape will produce certain stress on the non-display region, since the non-display region of the LCD has poor supporting capacity, when the stress acts on the peripheral non-display region, large deformation will be produced and be transmitted to a display region, which, on the one hand, will make a glass substrate at the edge of the display region generate phase delay, resulting in change of a polarization state of emitted light, and on the other hand, will also make the liquid crystal box thickness at the edge of the display region change, resulting in disordered liquid crystal distribution, such that the edge of the display region has the light leakage phenomenon.

SUMMARY

An embodiment of the present disclosure provides a display panel, including:
a first substrate;
at least one underlaying structure, arranged on the first substrate and in a non-display region of at least one side of a display region of the display panel; and
at least one supporting structure, arranged on one side, facing away from the first substrate, of the at least one underlaying structure,
wherein an orthographic projection of the supporting structure on the first substrate is within a range of an orthographic projection of the underlaying structure on the first substrate.

Optionally, in the embodiment of the present disclosure, the display panel further includes: a color light filter layer arranged in the display region, and a plurality of spacers arranged on one side, facing away from the first substrate, of the color light filter layer;
wherein the color light filter layer includes sub-pixel color resistors in at least three colors;
the underlaying structure includes: color resistor structures arranged on a same layer and made of a same material as the sub-pixel color resistor in at least one color; and the supporting structure is arranged on a same layer and made of a same material as the spacers; and
wherein the display panel further includes: a shading layer arranged between the underlaying structure and the first substrate, and a flat layer arranged on one side, facing away from the first substrate, of the underlaying structure.

Optionally, in the embodiment of the present disclosure, the plurality of spacers are divided into a plurality of main spacers and a plurality of sub-spacers; and
a sum of a height of the supporting structure and a thickness of the underlaying structure is greater than a sum of a height of one of the main spacers and a thickness of the color light filter layer.

Optionally, in the embodiment of the present disclosure, the display panel further includes: a second substrate arranged opposite to the first substrate;
a plurality of pixel units arranged in the display region in an array, and a plurality of data lines arranged on one side, facing the first substrate, of the second substrate, extending in a first direction and arranged in a second direction;
wherein the non-display region is divided into two first sub-regions arranged on two sides of the display region in the first direction, and two second sub-regions arranged on two sides of the display region in the second direction; the second direction is perpendicular to the first direction; and
each of the first sub-regions and each of the second sub-regions include the underlaying structure, respectively.

Optionally, in the embodiment of the present disclosure, the underlaying structure includes at least two color resistor structures;
orthographic projections of the color resistor structures which belong to a same underlaying structure on the first substrate have an overlapping region.

Optionally, in the embodiment of the present disclosure, orthographic projections of the color resistor structures which belong to a same underlaying structure on the first substrate do not overlap.

Optionally, in the embodiment of the present disclosure, in each of the first sub-regions, the underlaying structure includes the color resistor structures in three colors; in each of the second sub-regions, the underlaying structure includes the color resistor structures in one color; and
in the underlaying structure of each of the first sub-regions, the color resistor structures are arranged in one row in the second direction, and the color resistor structures in three colors are alternately arranged.

Optionally, in the embodiment of the present disclosure, the color resistor structures and first sub-pixel color resistors are connected into an integrated structure; and the first sub-pixel color resistors are sub-pixel color resistors arranged on an edge of the display region, and the first sub-pixel color resistors and the color resistor structures are adjacent and have the same color.

Optionally, in the embodiment of the present disclosure, in each of the first sub-regions, the underlaying structure includes the color resistor structures in three colors; in each of second sub-regions, the underlaying structure includes the color resistor structures in three colors; and
in the underlaying structure of each of the first sub-regions, the color resistor structures are arranged in one row in the second direction, and the color resistor structures in three colors are alternately arranged; and
in the underlaying structure of each of the second sub-regions, the color resistor structures are arranged in one row in the second direction, and the color resistor structures in three colors are alternately arranged.

Optionally, in the embodiment of the present disclosure, an end surface of one side, facing away from the first substrate, of the supporting structure is in contact with a surface of one side, facing the first substrate, of the second substrate.

Optionally, in the embodiment of the present disclosure, the non-display region further internally includes: a metal layer arranged on one side, facing the first substrate, of the second substrate; and an orthographic projection of the supporting structure on the second substrate is within a range of an orthographic projection of the metal layer on the second substrate.

Optionally, in the embodiment of the present disclosure, the non-display region further internally includes: a frame sealant arranged between the first substrate and the second substrate;

the frame sealant is arranged at an edge of the display panel;

the underlaying structure is arranged between the frame sealant and the display region, and a space exists between the underlaying structure and the frame sealant; and the space between the underlaying structure and the frame sealant is greater than a sum of position precision of the frame sealant and diffusion precision of the frame sealant as well as position precision of the underlaying structure.

Optionally, in the embodiment of the present disclosure, the supporting structure includes: strip-shaped spacers, and at least one of the strip-shaped spacers extends in the first direction or the second direction.

Optionally, in the embodiment of the present disclosure, gaps between the plurality of pixel units in the second direction are first gaps;

in each of the second sub-regions, the strip-shaped spacers extend in the second direction and are arranged in an array; and orthographic projections of at least part of the strip-shaped spacers on a plane perpendicular to the second direction have overlapping regions with orthographic projections of the first gaps on the plane perpendicular to the second direction.

Optionally, in the embodiment of the present disclosure, in each of the second sub-regions, a space between the strip-shaped spacer closest to the display region and the display region is greater than or equal to 0.5 mm.

Optionally, in the embodiment of the present disclosure, in each of the second sub-regions, the strip-shaped spacers extend in the first direction;

orthographic projections of the strip-shaped spacers arranged in a same second sub-region on a plane perpendicular to the second direction form a continuous figure; and in each of the second sub-regions, the farther from the display region, the longer the strip-shaped spacers in the first direction.

Optionally, in the embodiment of the present disclosure, in each of the second sub-regions, a space between the strip-shaped spacer closest to the display region and the display region is greater than or equal to 1.5 mm.

Optionally, in the embodiment of the present disclosure, in each of the first sub-regions, the strip-shaped spacers extend in the second direction;

orthographic projections of the strip-shaped spacers arranged in a same first sub-region on a plane perpendicular to the first direction form a continuous figure; and in each of the first sub-regions, the farther from the display region, the longer the strip-shaped spacers in the second direction.

Optionally, in the embodiment of the present disclosure, in each of the first sub-regions, a space between the strip-shaped spacer closest to the display region and the display region is greater than or equal to 1.5 mm.

Optionally, in the embodiment of the present disclosure, a contact density of the supporting structure in the first sub-regions is greater than 10,000 $\mu m^2/mm^2$; and a contact density of the supporting structure in the second sub-regions is greater than 5,000 $\mu m^2/mm^2$; and a compression amount of the supporting structure is within a range of 0.1 to 0.3 µm.

Optionally, in the embodiment of the present disclosure, the supporting structure further includes: point-shaped spacers; and the point-shaped spacers are distributed in gaps between the strip-shaped spacers.

Correspondingly, an embodiment of the present disclosure further provides a display device, including: the above display panel and a backlight module arranged on one side of an incident surface of the display panel;

wherein the backlight module includes a backlight source arranged on one side of the display device;

an underlaying structure corresponding to a side where the backlight source is arranged includes at least two laminated color resistor structures;

or, an underlaying structure corresponding to a side where the backlight source is arranged includes one color resistor structure.

DETAILED DESCRIPTION OF THE EMBODIMENTS

In order to solve the technical problem that a non-display region of a liquid crystal display has poor supporting capacity, such that a light leakage phenomenon is likely to occur at the edges of a display region, embodiments of the present disclosure provide a display panel and a display device.

The detailed description of the display panel and the display device according to the embodiments of the present disclosure is illustrated in detail below in conjunction with the accompanying drawings. The sizes and shapes of all parts in the accompanying drawings do not reflect true scales, and are only intended to schematically illustrate the content of the present disclosure.

Figure 1:
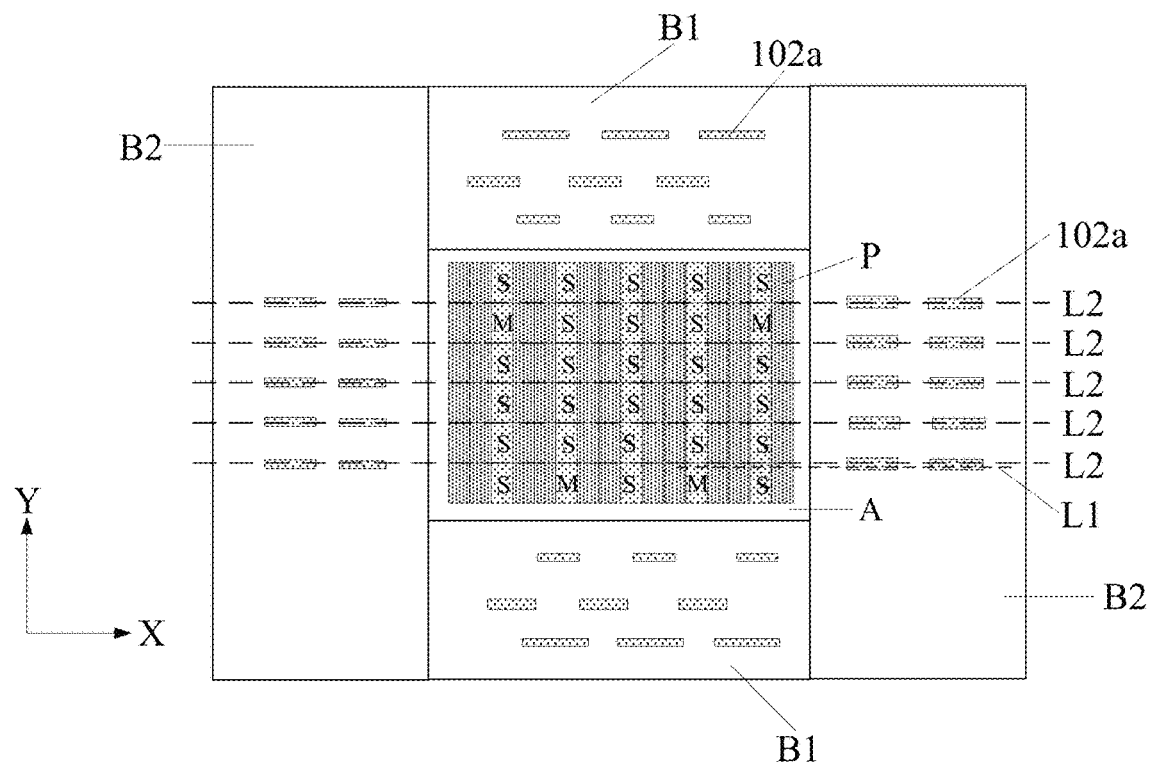
FIG. 1 illustrates a schematic top-view structural diagram of a display panel according to an embodiment of the present disclosure.
Figure 2:
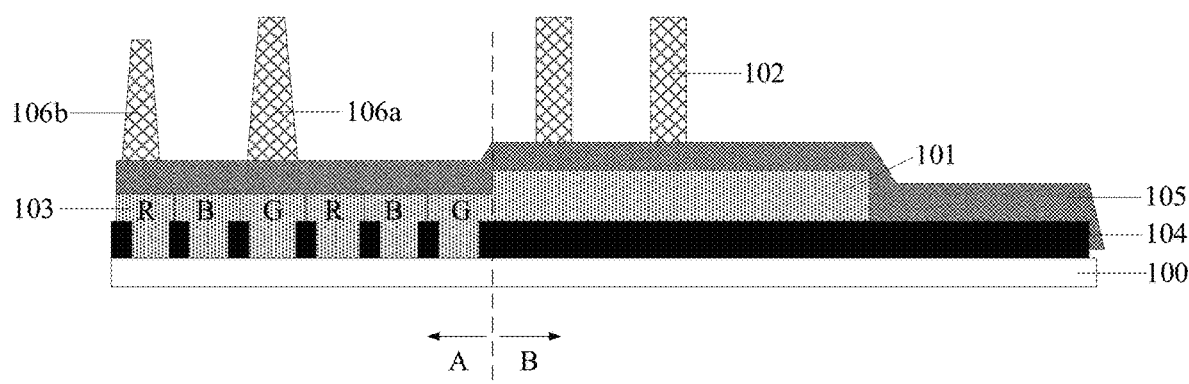
FIG. 2 illustrates a schematic cross-sectional diagram of the display panel according to the embodiment of the present disclosure.

FIG. 1 illustrates a schematic top-view structural diagram of a display panel according to an embodiment of the present disclosure, and FIG. 2 illustrates a cross-sectional diagram along a straight line L1 in FIG. 1.

As shown in FIG. 1 and FIG. 2, the display panel according to the embodiment of the present disclosure includes:

a first substrate 100;

at least one underlaying structure 101, arranged on the first substrate 100 and arranged in a non-display region B of at least one side of a display region A of the display panel; and at least one supporting structure 102, arranged on one side, facing away from the first substrate 100, of the underlaying structure 101.

where the orthographic projection of the supporting structure 102 on the first substrate 100 is within a range of the orthographic projection of the underlaying structure 101 on the first substrate 100.

In the above display panel according to the embodiment of the present disclosure, the underlaying structure and the supporting structure are arranged in the non-display region of at least one side of the display region, and the underlaying structure can underlay the supporting structure, so that the supporting capacity at the non-display region of the display panel is improved, the external force impact resistance at the non-display region of the display panel is improved, and the light leakage phenomenon at the edges of the display region is reduced.

As shown in FIG. 2, the orthographic projections of the supporting structures 102 on the first substrate 100 are within the range of the orthographic projections of the underlaying structures 101 on the first substrate 100, so that it is guaranteed that the underlaying structures 101 can underlay the whole supporting structures 102, the situation that part of the supporting structures 102 is underlaid with the underlaying structures 101 while the other part is not underlaid with the underlaying structures 101 is avoided, thereby avoiding poor supporting uniformity of the supporting structures 102 caused by segment spaces on the side, facing away from the first substrate 100, of the supporting structures 102, and thus the supporting capacity of the non-display region is guaranteed.

Specifically, in the embodiment of the present disclosure, the above display panel is preferably a liquid crystal display panel, that is, the display panel may further include a liquid crystal layer. The above first substrate may be an array substrate, namely the underlaying structure and the supporting structure may be located on the array substrate, or, the above first substrate may further be a color film substrate, namely the underlaying structure and the supporting structure may further be located on the color film substrate, and the positions of the underlaying structure and the supporting structure are not limited herein.

In specific embodiment, in the embodiment of the present disclosure, the underlaying structure and the supporting structure may be arranged in the non-display region of at least one side of the display region according to a light leakage condition in the display region of the display panel. For example, if the light leakage phenomenon only occurs at the edge of one side of the display region, the underlaying structure and the supporting structure may be only arranged in the non-display region located on the side.

Optionally, in order to guarantee that no light leakage phenomenon occurs in the edge of each side of the display region, as shown in FIG. 1, the underlaying structure and the supporting structure are arranged in the non-display region of each side of the display region A.

Figure 3A:
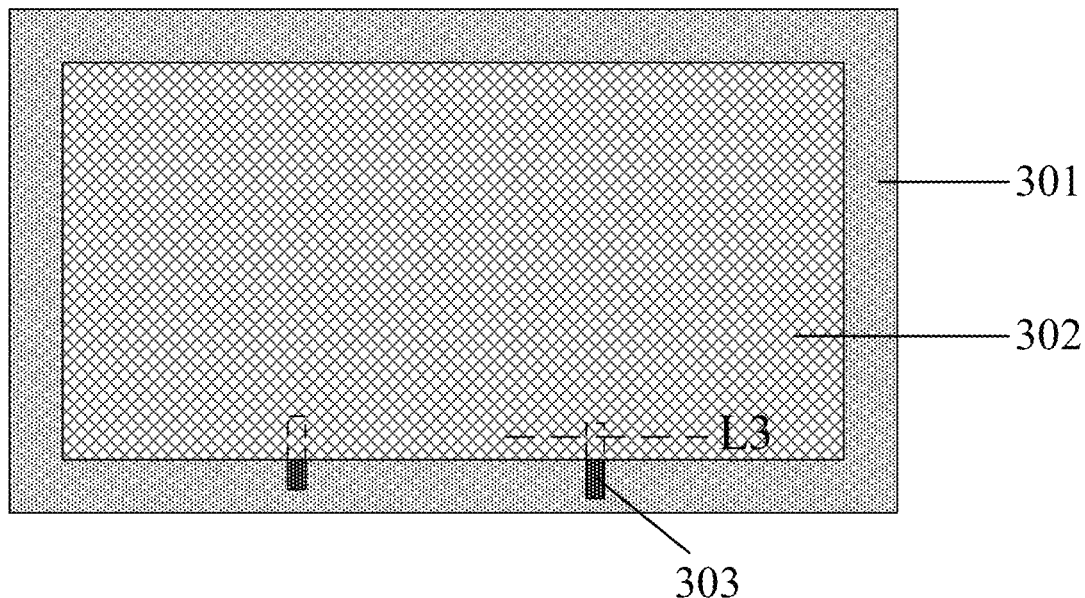
FIG. 3A illustrates a schematic top-view structural diagram of a display panel.
Figure 3B:
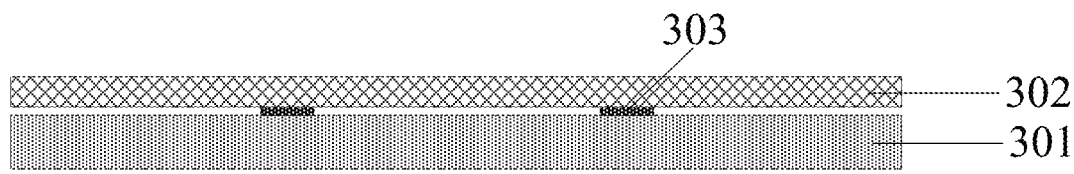
FIG. 3B illustrates a schematic cross-sectional diagram along a dotted line L3 in FIG. 3A.

FIG. 3A illustrates a schematic top-view structural diagram of a display panel, and FIG. 3B illustrates a schematic cross-sectional diagram along a dotted line L3 in FIG. 3A.

In specific embodiment, as shown in FIG. 3A and FIG. 3B, a light leakage condition of the display panel 302 subjected to stress brought by gaskets 303 may be detected by placing the display panel 302 on a machine table 301 and arranging the gaskets 303 between the display panel 302 and the machine table 301, where the gaskets 303 are located on an edge of the display panel 302. In FIG. 3A, in order to show a top view structure of the gaskets 303 more clearly, part of the gaskets 303 shielded by the display panel 302 in the FIG. 3 is represented by dotted lines.

In the embodiment of the present disclosure, the gaskets 303 are adopted to apply stress on the display panel 302, in specific embodiment, other detection methods may further be adopted, for example, press strips may be placed at edges of the surface of the display panel 302 to apply stress on the non-display region, the detection methods for applying stress are not limited herein, and the detection methods may be selected according to actual conditions.

Figure 3C:
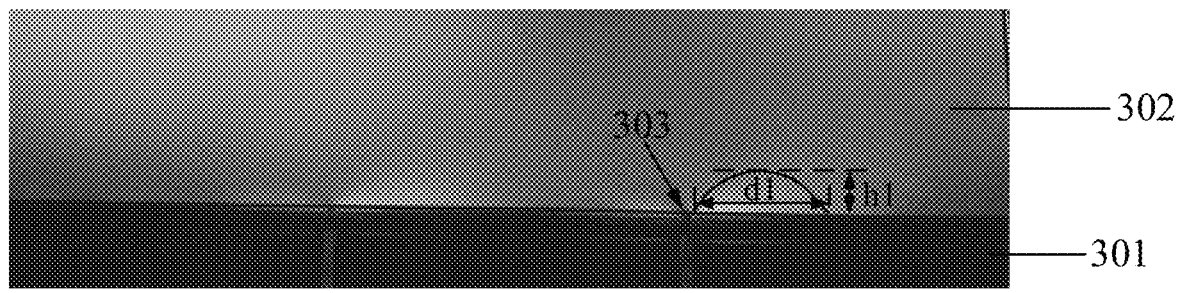
FIG. 3C illustrates a schematic diagram of a detected display panel without an underlaying structure or a supporting structure.
Figure 3D:
FIG. 3D illustrates a schematic diagram of a detected display panel with an underlaying structure and a supporting structure in the embodiment of the present disclosure.

FIG. 3C and FIG. 3D are schematic diagrams of real objects detected according to the above methods. FIG. 3C illustrates a schematic diagram of a detected display panel without an underlaying structure or a supporting structure. FIG. 3C illustrates a schematic diagram of a detected display panel of which a non-display region has poor supporting capacity, and FIG. 3D is a schematic diagram of the detected display panel provided with the underlaying structure and the supporting structure in the embodiment of the present disclosure.

It can be obviously seen from FIG. 3C that in the display panel of which the non-display region has the poor supporting capacity, the light leakage phenomenon is relatively serious near the gaskets 303. Taking a light leakage region on the right of the right gasket 303 as an example, a range of the light leakage region is appropriately marked with an arc in FIG. 3C, a width d1 of the light leakage region is about 5.5 mm, and a height h1 thereof is about 2.3 mm.

It can be obviously seen from FIG. 3D that in the display panel according to the embodiment of the present disclosure, the light leakage phenomenon is relatively weak near the gaskets 303. Taking a light leakage region on the right of the right gasket 303 as an example too, a range of the light leakage region is appropriately marked in a highlighted manner in FIG. 3D, a width d2 of the light leakage region is about 3.1 mm, and a height d2 thereof is about 1.0 mm.

Therefore, by comparing the size and light leakage intensity of the light leakage region in FIG. 3C and the size and light leakage intensity of the light leakage region in FIG. 3D, it can be obviously seen that the display panel according to the embodiment of the present disclosure can obviously reduce the light leakage phenomenon at the edges of the display panel.

Specifically, as shown in FIG. 2, the above display panel according to the embodiment of the present disclosure further includes: a color light filter layer 103 located in the display region A.

The color light filter layer 103 includes sub-pixel color resistors in at least three colors (e.g., in FIG. 2, R represents a sub-pixel color resistor in red, G represents a sub-pixel color resistor in green and B represents a sub-pixel color resistor in blue), so that the display panel may emit color light.

The underlaying structure 101 includes: color resistor structures located on a same layer and made of the same material with the sub-pixel color resistors in at least one color.

The color resistor structures in the underlaying structure 101 are located on the same layer and made of the same material with the sub-pixel color resistors, in the process of a manufacturing technique, the color resistor structures and the sub-pixel color resistors may be manufactured by the same technique, so as to reduce the manufacturing technique and lower the manufacturing cost.

In specific embodiment, as shown in FIG. 2, the above display panel according to the embodiment of the present disclosure includes: a plurality of spacers located in the display region A. The spacers are located on the side, facing away from the first substrate 100, of the color light filter layer 103.

The plurality of spacers are divided into a plurality of main spacers 106a and a plurality of sub-spacers 106b.

A sum of a height of the supporting structure 102 and a thickness of the underlaying structure 101 is greater than a sum of a height of the main spacer 106a and a thickness of the color light filter layer 103.

As shown in FIG. 2, that is, when other film layers on the first substrate 100 have the consistent thickness, the thickness of all the film layers on the first substrate 100 in the non-display region B is greater than the thickness of all the film layers on the first substrate 100 in the display region A, so that after the first substrate 100 and a second substrate are aligned later, the supporting structure 102 will be compressed, so as to support the first substrate 100 and the second substrate 200 therebetween to guarantee the supporting capacity at the non-display region of the display panel.

In specific embodiment, in order to guarantee the consistent box thickness at the display region A and the non-display region B of the display panel after alignment and prevent a poor display phenomenon, the sum of the height of the supporting structure 102 and the thickness of the underlaying structure 101 may be set to be slightly greater than the sum of the height of the main spacer 106a and the thickness of the color light filter layer 103.

In practical application, the above display panel according to the embodiment of the present disclosure further includes: the second substrate 200 arranged opposite to the first substrate 100.

As shown in FIG. 1, the display panel further includes: a plurality of pixel units P arranged in an array in the display region A, and a plurality of data lines (not shown in the figure) located on the side, facing the first substrate 100, of the second substrate 200 extending in a first direction Y and arranged in a second direction X.

The non-display region B is divided into two first sub-regions B1 and two second sub-regions B2; wherein the two first sub-regions B1 are located on two sides of the display region A in the first direction Y, and the two second sub-regions B2 are located on two sides of the display region A in the second direction X; and the second direction is perpendicular to the first direction.

The first sub-regions B1 and the second sub-regions B2 each include an underlaying structure.

Specifically, in order to guarantee that no light leakage phenomenon occurs at the edge of each side of the display region, strip-shaped spacers 102a may be arranged in the two first sub-regions B1 and the two second sub-regions B2 as shown in FIG. 1.

Figure 5:
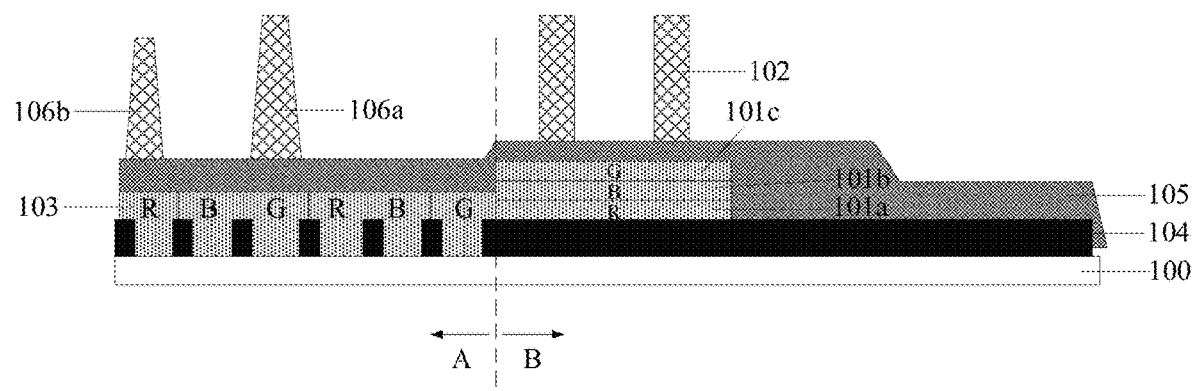
FIG. 5 illustrates a schematic cross-sectional diagram of another display panel according to an embodiment of the present disclosure.
Figure 6:
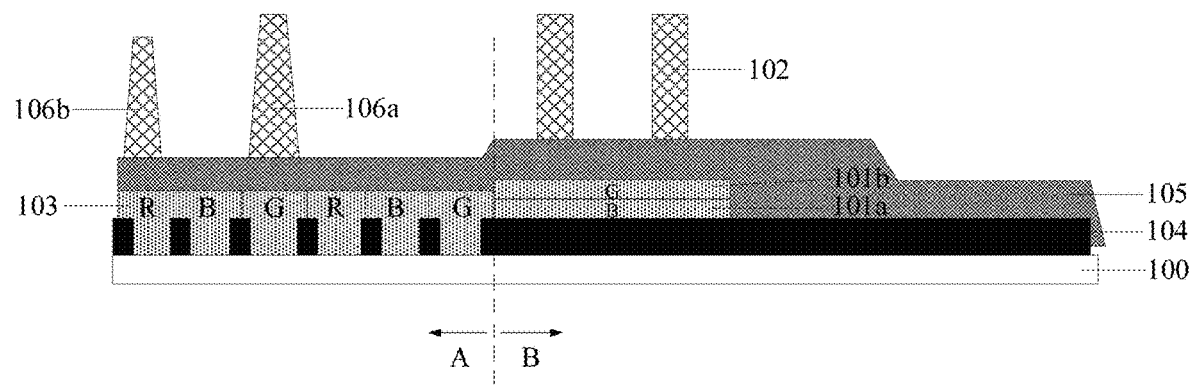
FIG. 6 illustrates a schematic cross-sectional diagram of another display panel according to an embodiment of the present disclosure.

Specifically, in the above display panel according to the embodiment of the present disclosure, as shown in FIG. 5 and FIG. 6, the underlaying structure includes at least two color resistor structures. As shown in FIG. 5, the underlaying structure may include a color resistor structure 101a, a color resistor structure 101b and a color resistor structure 101c. As shown in FIG. 6, the underlaying structure may include a color resistor structure 101a and a color resistor structure 101b.

Orthographic projections of the color resistor structures which belong to a same underlaying structure on the first substrate have an overlapping region. As shown in FIG. 5, the orthographic projection of the color resistor structure 101a, the orthographic projection of the color resistor structure 101b and the orthographic projection of the color resistor structure 101c on the first substrate 100 have the overlapping region, that is, the color resistor structures 101a, 101b and 101c are arranged in a laminated manner. As shown in FIG. 6, the orthographic projection of the color resistor structure 101a and the orthographic projection of the color resistor structure 101b on the first substrate have the overlapping region, that is, the color resistor structures 101a and 101b are arranged in a laminated manner, so that different numbers of color resistor structures may be laminated to obtain the underlaying structure with different thicknesses. In specific embodiment, the number of the color resistor structures in the underlaying structure may be determined according to actual demands, or, the height of the color resistor structures may also be adjusted through a halftone mask.

In the process of a manufacturing technique, different masks may be adopted to respectively manufacture the sub-pixel color resistors in different colors, figures of the color resistor structures may be set at positions, corresponding to the non-display region, of at least two masks, and therefore the color resistor structures and the sub-pixel color resistors in the display region may be manufactured through the same composition technique.

Specifically, as shown in FIG. 5, the color resistor structure 101a and the sub-pixel color resistor in red in the display region A may be manufactured through a same composition technique, the color resistor structure 101b and the sub-pixel color resistor in blue in the display region A may be manufactured through a same composition technique, and the color resistor structure 101c and the sub-pixel color resistor in green in the display region A may be manufactured through a same composition technique. Therefore, three layers of color resistor structures (101a, 101b and 101c) arranged in a laminated manner may be obtained through the three times of composition technique for the sub-pixel color resistors.

Figure 7:
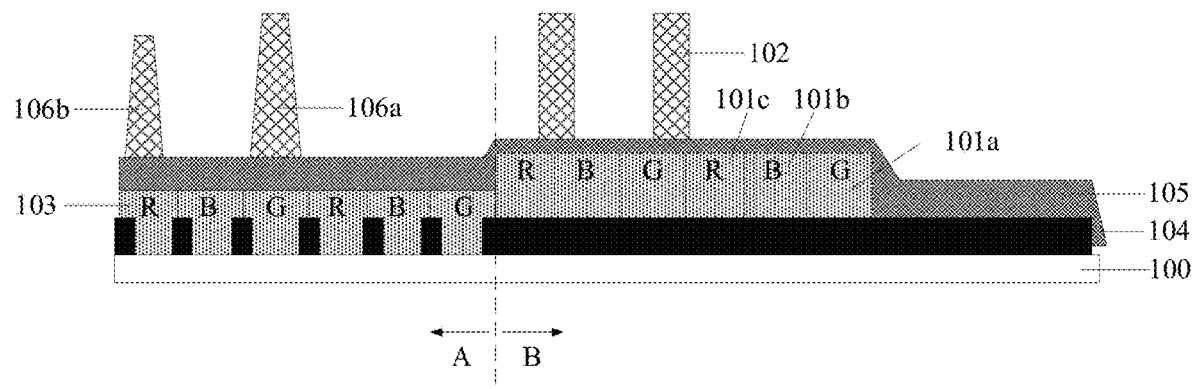
FIG. 7 illustrates a schematic cross-sectional diagram of another display panel according to an embodiment of the present disclosure.

In specific embodiment, in the display panel according to the embodiment of the present disclosure, as shown in FIG. 7, orthographic projections of the color resistor structures (such as 101a, 101b and 101c in FIG. 7) which belong to a same underlaying structure on the first substrate 100 do not overlap.

In the actual technique process, the same mask may be adopted to manufacture the sub-pixel color resistors in different colors. Taking the structure shown in FIG. 7 as an example, figures of sub-pixels are set at the positions, corresponding to the display region, of the mask, and figures of the color resistor structures are set at the positions, corresponding to the non-display region, of the mask. In the manufacturing process, the mask may be adopted to manufacture the sub-pixel color resistors in red first so as to form color resistor structures in red 101c in the non-display region, then, the mask is staggered by the distance of one pixel unit for manufacturing the sub-pixel color resistors in blue so as to form color resistor structures in blue 101b in the non-display region, and finally, the mask is staggered by the distance of one pixel unit again for manufacturing the sub-pixel color resistors in green so as to form color resistor structures in green 101a in the non-display region.

This is only for illustration herein, in the actual technique process, the mask may also be staggered by the distance of more pixel units for manufacturing the sub-pixel color resistors in different colors, and a total staggering distance is integer multiples of dimensions of the pixel units. Moreover, in practical application, the color order of the manufactured sub-pixel color resistors may also be determined according to actual needs, which is not limited herein.

In addition, different masks may also be adopted to respectively manufacture the sub-pixel color resistors in different colors, and the manufacturing technique is not limited herein.

Compared with the display panel shown in FIG. 5 and FIG. 6, in the display panel shown in FIG. 7, the orthographic projections of the color resistor structures which belong to a same underlaying structure on the first substrate 100 do not overlap.

In the manufacturing process, the color resistor structures and the sub-pixel color resistors in the display region may adopt the same composition technique, and the same mask is adopted to manufacture the color resistor structures in different colors, so that the number of the masks can be saved, and the manufacturing cost of the technique is lowered. In practical application, on the basis of meeting requirements of the underlaying structure and in order to lower the technique cost as much as possible, the embodiment of the present disclosure preferably adopts the structure shown in FIG. 7 or FIG. 6.

Figure 8:
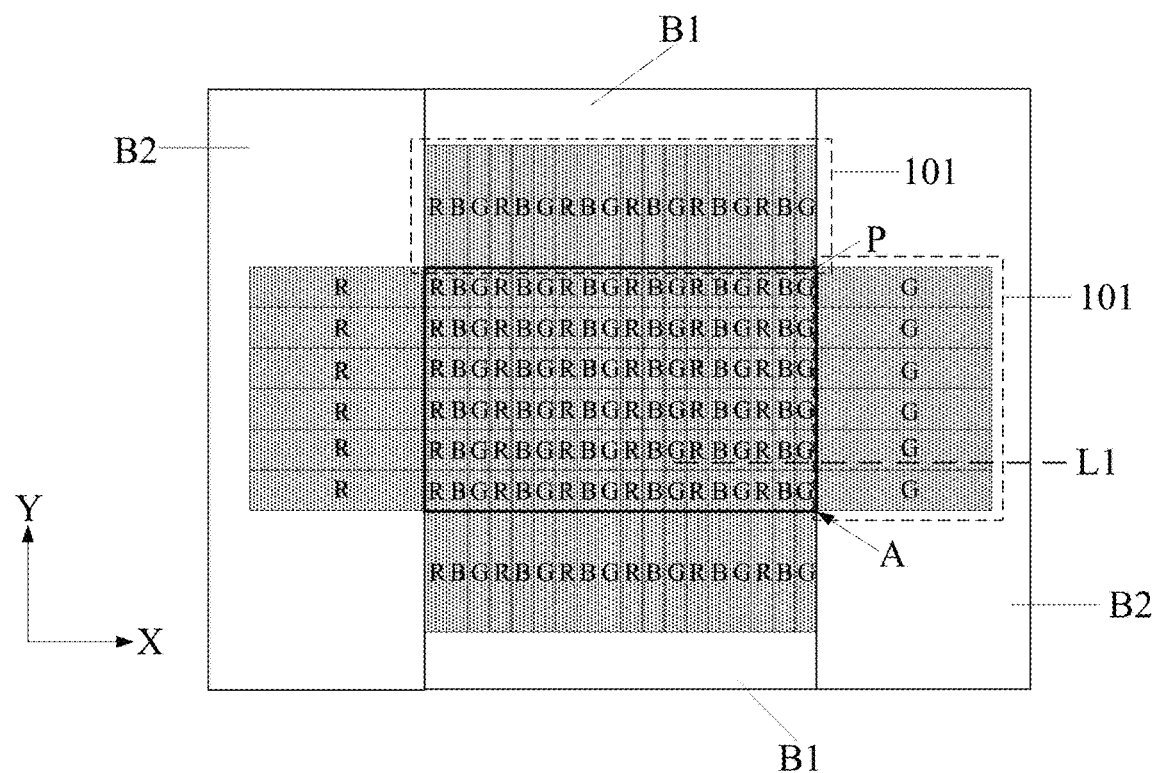
FIG. 8 illustrates a schematic top-view structural diagram of another display panel according to an embodiment of the present disclosure.

Specifically, in the above display panel according to the embodiment of the present disclosure, as shown in FIG. 8, in each first sub-region B1, the underlaying structure 101 includes the color resistor structures in three colors. In each second sub-region B2, the underlaying structure 101 includes the color resistor structures in one color. For example, the second sub-region B2 on the left in FIG. 8 includes a plurality of color resistor structures in red, and the second sub-region B2 on the right in FIG. 8 includes a plurality of color resistor structures in green.

In the underlaying structure 101 of each first sub-region B1, the color resistor structures are arranged in one row in the second direction X, and the color resistor structures in three colors are alternately arranged.

In the underlaying structure 101 of each second sub-region B2, the color resistor structures are arranged in one row in the first direction Y.

As shown in FIG. 8, generally, the pixel units P in the display region A are arranged in an array, a width of each color resistor structure in each first sub-region B1 in the second direction X may be set to be the same as a width of the pixel unit P in the second direction X, a width of each color resistor structure in each second sub-region B2 in the first direction Y may be set to be the same as a width of the pixel unit P in the first direction Y, and accordingly the underlaying structure in the non-display region can be conveniently arranged.

In specific embodiment, the underlaying structure in each second sub-region may also be an integrated structure, that is, the underlaying structure is composed of one color resistor structure. For example, only one color resistor structure in red may be arranged in the second sub-region on the left, only one color resistor structure in green may be arranged in the second sub-region on the right, and color resistor structures in other colors may also be arranged in the second sub-regions, which is not limited herein.

More specifically, in the above display panel according to the embodiment of the present disclosure, also referring to FIG. 8, the color resistor structures and first sub-pixel color resistors are connected into an integrated structure.

The first sub-pixel color resistors are sub-pixel color resistors located at edges of the display region A, and the first sub-pixel color resistors and the color resistor structures are adjacent and have the same color.

In the display region A, the pixel units P in three colors in each row are alternately arranged in the second direction X, the pixel units P in each row have the same color in the first direction Y. The color resistor structures in the non-display region are arranged to be an integrated structure with the first sub-pixel color resistors, and the pixel units at the farthest edges of the display region just need to extend to the non-display region, which is more conductive to composition of the color resistor structures in the non-display region.

As shown in FIG. 8, in the actual technique process, three different masks may be adopted to respectively manufacture the sub-pixel color resistors in different colors. In the mask for manufacturing the sub-pixel color resistors in red, figures of the underlaying structure are set in the positions corresponding to the two first sub-regions B1 and the second sub-region B2 on the left. Based on the same principle, figures of the underlaying structure may be set in the masks for manufacturing the sub-pixel color resistors in blue and the sub-pixel color resistors in green, so that the underlaying structure in the non-display region are manufactured while the sub-pixel color resistors in the display region are manufactured.

Figure 9:
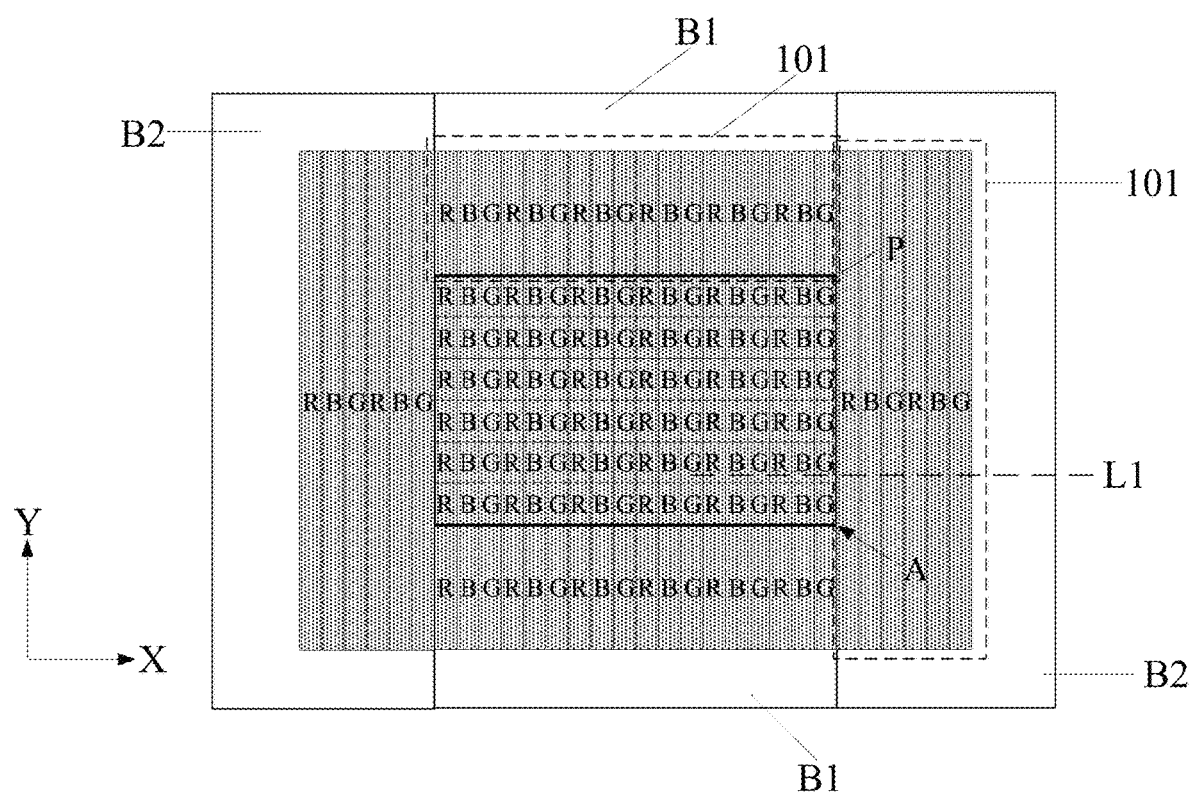
FIG. 9 illustrates a schematic top-view structural diagram of another display panel according to an embodiment of the present disclosure.

In specific embodiment, in the above display panel according to the embodiment of the present disclosure, as shown in FIG. 9, in each first sub-region B1, the underlaying structure 101 includes the color resistor structures in three colors; and in each second sub-region B2, the underlaying structure 101 includes the color resistor structures in three colors.

In the underlaying structure 101 of each first sub-region B1, the color resistor structures are arranged in one row in the second direction X, and the color resistor structures in three colors are alternately arranged.

In the underlaying structure 101 of each second sub-region B2, the color resistor structures are arranged in one row in the second direction X, and the color resistor structures in three colors are alternately arranged.

As shown in FIG. 9, in the first sub-regions B1 and the second sub-regions B2, the color resistor structures are alternately arranged in the second direction X, and accordingly in the actual technique process, the same mask may be adopted to manufacture the color resistor structures in different colors.

In practical application, the underlaying structure in the non-display region may also be arranged to be composed of only one color resistor structure, that is, the underlaying structure may be an integrated structure. Moreover, the underlaying structure may be arranged at positions, extending to the non-display region, of the display region, as shown in FIG. 8. Or, the underlaying structure may also be arranged at positions other than the positions, extending to the non-display region, of the display region, as shown in FIG. 9. Specific distribution of the underlaying structure in the non-display region is not limited herein, and the specific distribution condition of the underlaying structure may be set according to actual demands.

Specifically, as shown in FIG. 2, the above display panel according to the embodiment of the present disclosure further includes: a shading layer 104 located between the underlaying structure 101 and the first substrate 100, and a flat layer 105 located on one side, facing away from the first substrate 100, of the underlaying structure 101.

In specific embodiment, the shading layer 104 extends into the non-display region B, which may prevent light leakage at the non-display region and guarantee the display effect of the display panel. The shading layer 104 located in the non-display region B may further underlay the supporting structure 102 and further improve the supporting capacity at the non-display region of the display panel.

The flat layer 105 extends into the non-display region B, which may flatten the film layers in the non-display region B. An orthographic projection of the flat layer 105 on the first substrate 100 and an orthographic projection of the underlaying structure 101 on the first substrate 100 have an overlapping region. Accordingly, part of the flat layer 105 extending into the non-display region B may further underlay the supporting structure 102 and further improve the supporting capacity at the non-display region of the display panel.

In addition, in the embodiment of the present disclosure, the underlaying structure is composed of color resistor structures located on the same layer and made of the same material with the sub-pixel color resistors in at least one color, which is an implementation in the embodiment of the present disclosure. In practical application, the underlaying structure may also be located on the same layer and made of the same material with other film layers, such as the flat layer or the shading layer, or, the underlaying structure may also be separately manufactured in the non-display region through a composition technique, which is not limited herein.

Figure 4:
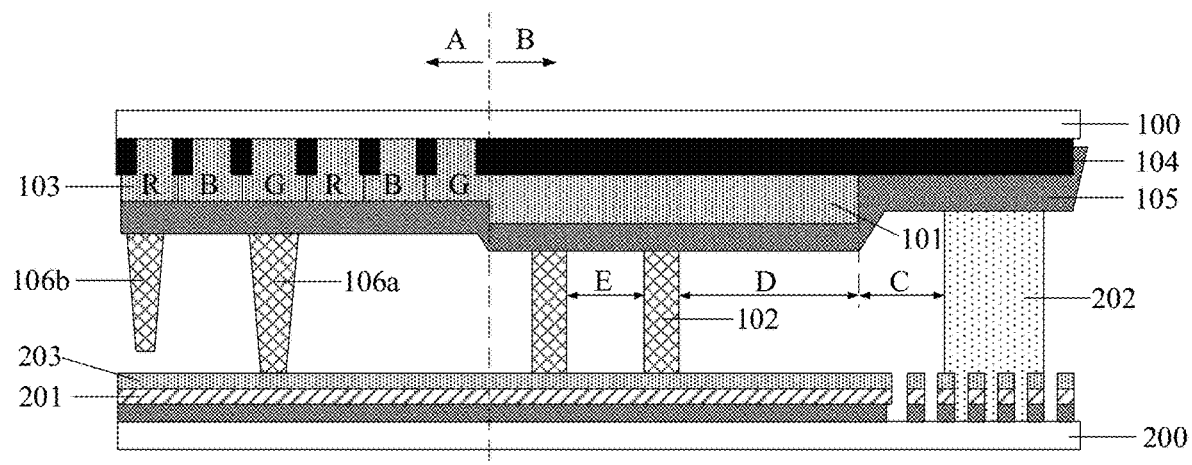
FIG. 4 illustrates a schematic cross-sectional diagram of another display panel according to an embodiment of the present disclosure.

Further, In the above display panel according to the embodiment of the present disclosure, as shown in FIG. 4, an end surface of one side, facing away from the first substrate 100, of the supporting structure 102 is in contact with a surface of one side, facing the first substrate 100, of the second substrate 200, so that the supporting capacity at the non-display region of the display panel may be further improved, the external force impact resistance at the non-display region of the display panel may be further improved, and the light leakage phenomenon at the edges of the display region is reduced.

In specific embodiment, the thickness of the underlaying structure 101 may be determined in combination with the height of the supporting structure 102, so as to guarantee that the end surface of the side, facing away from the first substrate 100, of the supporting structure 102 is in contact with the surface of the side, facing the first substrate 100, of the second substrate 200.

In practical application, in the above display panel according to the embodiment of the present disclosure, also referring to FIG. 4, the non-display region B further internally includes: a metal layer 201 located on the side, facing the first substrate 100, of the second substrate 200.

An orthographic projection of each supporting structure 102 on the second substrate 200 is within a range of an orthographic projection of the metal layer 201 on the second substrate 200.

That is, the supporting structures 102 in the non-display region B are all located on the metal layer 201, therefore, the consistent compression amount of the supporting structures 102 may be guaranteed, and the uniformity of the supporting capacity in the non-display region B is good.

Specifically, the above metal layer may be a gate layer or a source-drain metal layer or other film layers, which is not limited herein, as long as each supporting structure 102 supports the same metal layer. It should be noted that the supporting structure 102 is not in direct contact with the metal layer 201, and an insulating layer 203 may also be arranged between the metal layer 201 and the supporting structure 102.

In addition, the supporting structures 102 in the non-display region B may be all located in regions outside figures of the metal layer 201, which can also make the uniformity of the supporting capacity in the non-display region B good.

In specific embodiment, in the above display panel according to the embodiment of the present disclosure, as shown FIG. 4, the non-display region B further internally includes: a frame sealant 202 located between the first substrate 100 and the second substrate 200.

The frame sealant 202 is located at an edge of the display panel.

The underlaying structure 101 is located between the frame sealant 202 and the display region A, and a space C exists between the underlaying structure 101 and the frame sealant 202.

The first substrate 100 and the second substrate 200 are fixed through the frame sealant 202. To guarantee that the underlaying structure 101 does not affect diffusion of the frame sealant 202 and to guarantee the packaging effect of the display panel, it is necessary to guarantee that a space C exists between the underlaying structure 101 and the frame sealant 202.

Specifically, in the above display panel according to the embodiment of the present disclosure, as shown in FIG. 4, the space C between the underlaying structure 101 and the frame sealant 202 is greater than a sum of position precision of the frame sealant 202 and diffusion precision of the frame sealant 202 as well as position precision of the underlaying structure 101.

In the case that the different masks are adopted to respectively manufacture the sub-pixel color resistors in different colors, the above space C between the underlaying structure 101 and the frame sealant 202 needs to be greater than a sum of the position precision of the frame sealant 202 and the diffusion precision of the frame sealant 202 as well as the position precision of the underlaying structure 101.

In the case that the same mask is adopted to manufacture the sub-pixel color resistors in different colors, the above space C is equal to a difference value between a distance from the frame sealant 202 to an edge of the display region A and the dimensions of N pixel units, wherein N is an integer. The space C needs to be greater than the sum of the position precision of the frame sealant 202 and the diffusion precision of the frame sealant 202 as well as the position precision of the underlaying structure 101.

The position precision of the frame sealant may be understood as a difference between a designed position and an actual position of the frame sealant.

In the specific technique process, edges of the first substrate (or the second substrate) are coated with the colloidal frame sealant first, and the frame sealant is solidified after the first substrate and the second substrate are aligned. In the process of coating the frame sealant, the frame sealant will diffuse in a certain region due to its fluidity, and the diffusion precision of the frame sealant may be understood as the size of a diffusion region of the frame sealant.

The position precision of the underlaying structure may be understood as a difference between a designed position and an actual position of the underlaying structure.

Also referring to FIG. 4, a distance between an edge of the side, away from the display region A, of the supporting structure 102 farthest from the display region A and an edge of the side, away from the display region A, of the underlaying structure 101 is D. Also referring to FIG. 7, considering that each underlaying structure 101 may be composed of the plurality of staggered color resistor structures, the distance D needs to be greater than the dimensions of the pixel units, so as to guarantee that the supporting structure 102 can be located on the flat underlaying structure 101 and guarantee the uniformity of supporting capacity.

In the actual technique process, after the first substrate 100 and the second substrate 200 are aligned, the frame sealant 202 needs to be solidified in an illumination way. In order to avoid light leakage at the non-display region, the shading layer 104 is arranged on one side of the first substrate 100, therefore, the metal layer 201 and the insulating layer 203 on the second substrate 200 may be patterned, so as to form a plurality of through holes in the position corresponding to the frame sealant 202, and one side of the second substrate 200 may be illuminated to solidify the frame sealant 202.

As shown in FIG. 4, a distance between the adjacent supporting structures 102 is E. The distance E may be determined in combination with the position where the supporting structure 102 can be accommodated in the display panel, for example, the figure distribution condition of the metal layer 201 may be considered. For example, the distance E may be 100 μm to 1,000 μm, and the distance E may also be set according to actual conditions, which is not limited herein.

Specifically, in the above display panel according to the embodiment of the present disclosure, as shown in FIG. 4, the display region A further internally includes: a plurality of spacers (e.g., spacers 106a and 106b in FIG. 4) located on the side, facing away from the first substrate 100, of the color light filter layer 103.

The supporting structure 102 is located on the same layer and made of the same material with the spacers.

In the process of a manufacturing technique, the supporting structure 102 and the spacers may be manufactured through the same composition technique so as to save technique steps and lower the manufacturing cost.

Specifically, as shown in FIG. 4, the spacer capable of making contact with surfaces of both the first substrate 100 and the second substrate 200 is a main spacer 106a, and the spacer only in contact with the surface of the first substrate 100 and not in contact with the surface of the second substrate 200 is a sub-spacer 106b. Since the underlaying structure 101 is arranged at the position of the supporting structure 102, the height of the supporting structure 102 may be set the same as the height of the sub-spacer 106b, and by adjusting the thickness of the underlaying structure 101, the supporting structure 102 can support the first substrate 100 and the second substrate 200 therebetween.

In specific embodiment, the supporting structure 102 and the sub-spacer 106b may be manufactured through the same composition technique, or, the supporting structure 102, the main spacer 106a and the sub-spacer 106b may also adopt a halftone mask to realize manufacture through the same composition technique.

In specific embodiment, in the above display panel according to the embodiment of the present disclosure, the above supporting structure includes: strip-shaped spacers 102a, and at least one strip-shaped spacer 102a extends in the first direction Y or the second direction X.

If spaces allow, by adopting the strip-shaped spacers 102a extending in the first direction Y or the second direction X, the strip-shaped spacers 102a have a large supporting range and may make the supporting effect of the non-display region B good.

Specifically, as shown in FIG. 1, positions of M in the display region A represent positions of the main spacers, and positions of S represent positions of the sub-spacers. In specific embodiment, distribution of the main spacers M and the sub-spacers S may be determined according to actual conditions, which is not limited herein. Specifically, at least two rows of strip-shaped spacers may be arranged, and the number of the strip-shaped spacers may be determined according to required contact density.

In specific embodiment, in the display panel according to the embodiment of the present disclosure, as shown in FIG. 1, gaps between the plurality of pixel units P in the second direction X are first gaps.

In each second sub-region B2, the strip-shaped spacers 102a extend in the second direction X and are arranged in an array, and orthographic projections of at least part of the strip-shaped spacers 102a on a plane perpendicular to the second direction X have overlapping regions with orthographic projections of the first gaps on the plane perpendicular to the second direction X. Dotted lines L2 in FIG. 1 represent straight lines where the first gaps are located.

In the technique manufacturing process, after the first substrate is manufactured, rubbing alignment needs to be performed on an alignment layer on the surface of the first substrate. Specifically, rolling friction may be performed by rollers in the second direction X, and in order to avoid influences of the strip-shaped spacers on the rollers in the rubbing alignment process and avoid influences of damaged rollers on the rubbing alignment effect, the strip-shaped spacers 102a may be arranged at positions, extending to the non-display region, of the first gaps.

As shown in FIG. 1, the strip-shaped spacers 102a in each second sub-region B2 are all located at positions of the dotted lines L2. In the rubbing alignment process, when the rollers roll in the second direction X, the rollers make contact with the strip-shaped spacers 102a at positions corresponding to the first gaps, so that it is guaranteed that the rollers are not in contact with the strip-shaped spacers 102a at positions corresponding to the pixel units and it is guaranteed that the rollers are not damaged at the positions corresponding to the pixel units, and the display panel can have a good display effect.

Specifically, in each second sub-region B2, values of lengths of the strip-shaped spacers 102a in the second direction X are less than or equal to two kinds of values as far as possible. For example, in the structure shown in FIG. 1, the lengths of a row of strip-shaped spacers 102a in the first direction Y may be first values, the lengths of the other row of strip-shaped spacers 102a may be second values, and specific values of the lengths of the strip-shaped spacers 102a may be integer multiples of the dimensions of the pixel units.

To avoid influences of the strip-shaped spacers 102a on the display region A, in each second sub-region B2, a space between the strip-shaped spacer 102a closest to the display region A and the display region A is greater than or equal to 0.5 mm.

Figure 10:
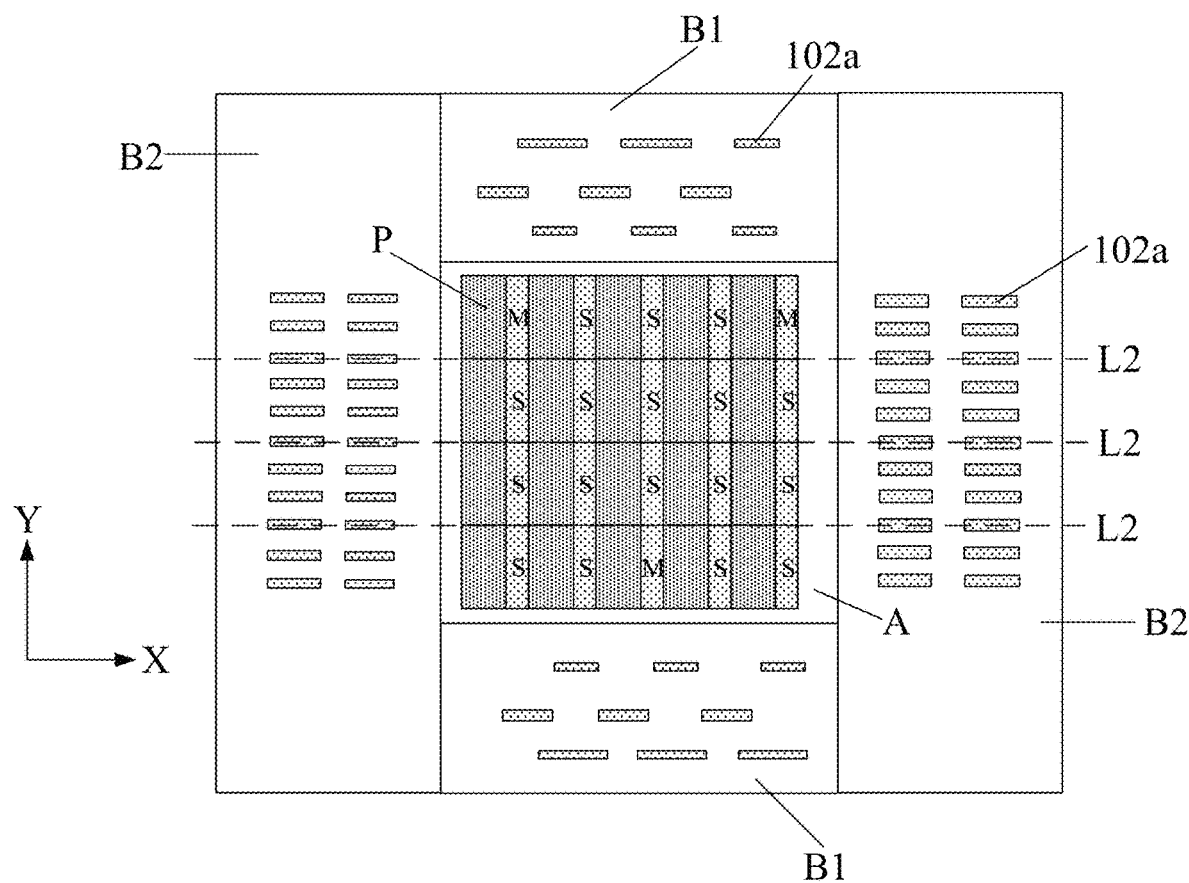
FIG. 10 illustrates a schematic top-view structural diagram of another display panel according to an embodiment of the present disclosure.

As shown in FIG. 10, in each second sub-region B2, only part of the strip-shaped spacers 102a are located at positions, extending to the non-display region, of the first gaps. To lower influences of the strip-shaped spacers 102a on a rubbing alignment technique as much as possible, the row of strip-shaped spacers 102a extending in the first direction Y may be evenly distributed, and it is guaranteed as much as possible that there are strip-shaped spacers 102a at the positions of the dotted lines L2.

Or, as shown in FIG. 1, all the strip-shaped spacers 102a are located at the positions, extending to the non-display region, of the first gaps, so as to lower the influences of the strip-shaped spacers 102a on the rubbing alignment technique to the minimum.

Figure 11:
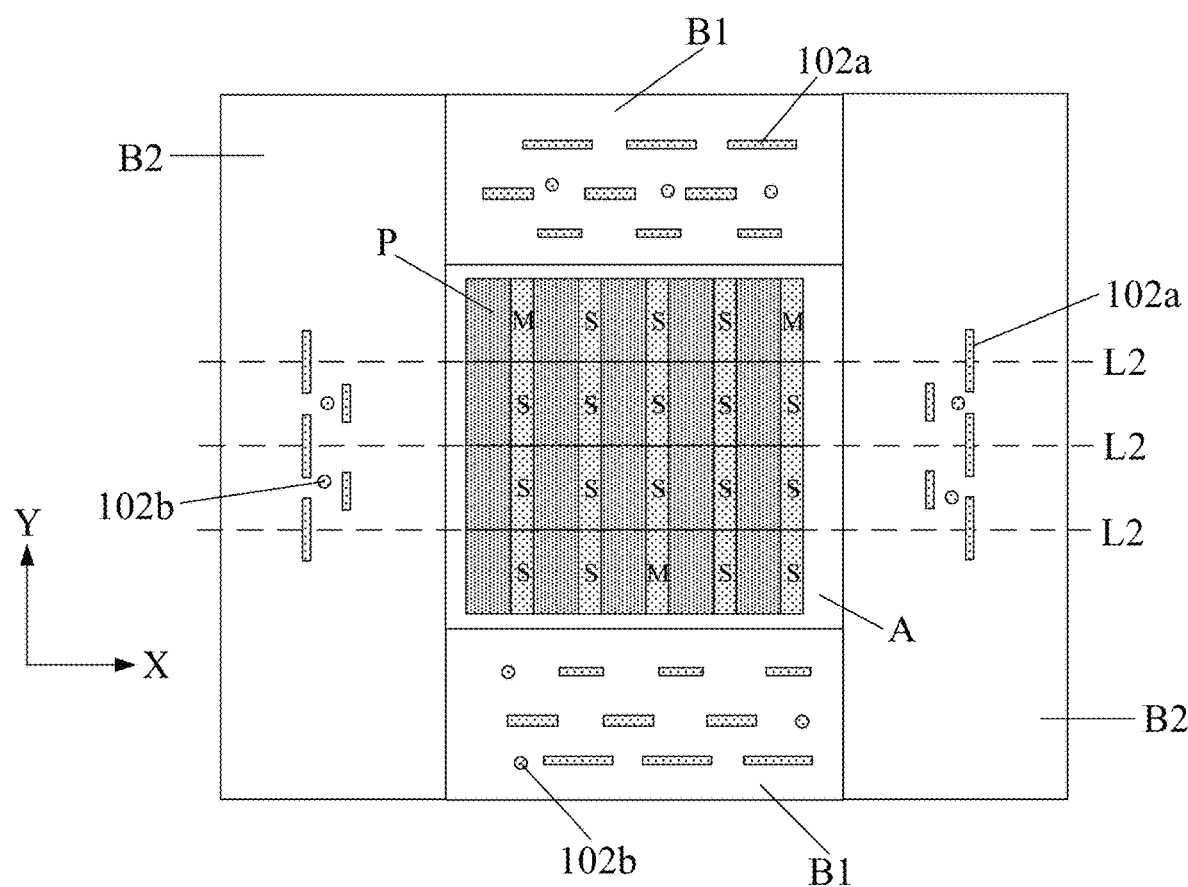
FIG. 11 illustrates a schematic top-view structural diagram of another display panel according to an embodiment of the present disclosure.

In addition, in the above display panel according to the embodiment of the present disclosure, as shown in FIG. 11, in each second sub-region B2, the strip-shaped spacers 102a extend in the first direction Y.

Orthographic projections of the strip-shaped spacers 102a, located in the same second sub-region B2, on a plane perpendicular to the second direction X form a continuous figure.

The orthographic projections of the strip-shaped spacers 102a, located in the same second sub-region B2, on the plane perpendicular to the second direction X form the continuous figure, in the process of the rubbing alignment technique, the rollers roll in the second direction X, influences of the strip-shaped spacers 102a on the rollers are relatively uniform, and thus the influences of the strip-shaped spacers 102a on the rollers are lowered, and the display effect of the display panel is guaranteed. To avoid the influences of the strip-shaped spacers 102a on the display region A, in each second sub-region, a space between the strip-shaped spacer closest to the display region and the display region is greater than or equal to 1.5 mm.

Further, in the above display panel according to the embodiment of the present disclosure, also referring to FIG. 11, in each second sub-region B2, the farther from the display region A, the longer the strip-shaped spacers 102a in the first direction, and therefore foreign substances may be effectively blocked to be prevented from entering the display region A. In addition, to avoid the influences of the strip-shaped spacers 102a on the display region A, in each second sub-region, the space between the strip-shaped spacer closest to the display region and the display region is greater than or equal to 1.5 mm.

In practical application, in the above display panel according to the embodiment of the present disclosure, as shown in FIG. 1, in each first sub-region B1, the strip-shaped spacers 102a extend in the second direction X.

Orthographic projections of the strip-shaped spacers 102a, located in the same first sub-region B1, on a plane perpendicular to the first direction Y form a continuous figure. In each first sub-region B1, the strip-shaped spacers 102a extend in the second direction X, so as to effectively block foreign substances and prevent the foreign substances from entering the display region A. Moreover, the strip-shaped spacers 102a belonging to the same first sub-region B1 are arranged in a staggered manner, so as to make orthographic projections of the strip-shaped spacers 102a on the plane perpendicular to the first direction Y form the continuous figure, and the capacity of blocking foreign substances may be further enhanced. Specifically, at least two rows of strip-shaped spacers may be arranged, and the number of the strip-shaped spacers may be determined according to required contact density.

Further, in the above display panel according to the embodiment of the present disclosure, also referring to FIG. 1, in each first sub-region B1, the farther from the display region A, the longer the strip-shaped spacers 102a in the second direction X, and therefore foreign substances may be effectively blocked to be prevented from entering the display region A, and the display effect of the display panel is avoided being affected by the foreign substances entering the display region A.

In each first sub-region B1, values of lengths of the strip-shaped spacers 102a in the second direction X are less than or equal to two kinds of values as far as possible. For example, the lengths of the strip-shaped spacers 102a may be the same, or, the lengths of the first row and the third row of strip-shaped spacers may be first values, the lengths of the second row of strip-shaped spacers may be second values. Specifically, the lengths of the strip-shaped spacers may be integer multiples of the dimensions of the pixel units.

In specific embodiment, dimensions of the strip-shaped spacers 102a at different positions may be determined in combination with specific spaces in the first sub-regions B1 and the second sub-regions B2. That is, the lengths of the strip-shaped spacers 102a in the first direction Y or the second direction X may be adjusted according to actual conditions, for example, widths of the strip-shaped spacers 102a may be set in a range of 20 μm to 80 μm.

In addition, in order to avoid the influences of the strip-shaped spacers 102a on the display region A, in each first sub-region, a space between the strip-shaped spacer closest to the display region and the display region is greater than or equal to 1.5 mm.

In practical application, in the above display panel according to the embodiment of the present disclosure, a contact density of the supporting structure in the first sub-regions B1 may be greater than 10,000 μm$^2$/mm$^2$.

A contact density of the supporting structure in the second sub-regions B2 may be greater than 5,000 μm$^2$/mm$^2$.

The supporting structure may be arranged by adopting the way in FIG. 1, FIG. 10 or FIG. 11, according to contact density requirements of the first sub-regions B1 and the second sub-regions B2 as well as figure distribution conditions of other relevant film layers in the display panel, for example, figure distribution of the metal layer is considered, and therefore, the display panel has good supporting capacity at the first sub-regions B1 and the second sub-regions B2.

Moreover, in order to achieve good supporting uniformity at the non-display region, a uniform shape of the supporting structures in the non-display region is ensured as much as possible, for example, in FIG. 1, the strip-shaped spacers 102a have the consistent extending direction.

In practical application, in the above display panel according to the embodiment of the present disclosure, a compression amount of the supporting structure is in a range of 0.1 to 0.3 μm.

Taking the structure shown in FIG. 4 as an example, in the manufacturing process, the height of the supporting structure 102 manufactured on the first substrate 100 is slightly higher than a distance between the flat layer 105 and the metal layer 201, a difference between this distance and the height of the supporting structure 102 is the compression amount, and therefore, after the first substrate 100 and the second substrate 200 are aligned, the supporting structure 102 will be compressed, so as to support the first substrate 100 and the second substrate 200 therebetween and guarantee the supporting capacity at the non-display region of the display panel. In addition, too large compression amount will cause poor yellow light at the position, so that the compression amount may be set in the range of 0.1 to 0.3 μm. That is, the height of the supporting structure 102 is slightly higher than the distance between the flat layer 105 and the metal layer 201.

In addition, in the above display panel according to the embodiment of the present disclosure, as shown in FIG. 11, the supporting structure may further include: point-shaped spacers 102b.

The point-shaped spacers 102b are arranged in gaps between the strip-shaped spacers 102a.

In order to meet the requirement of the contact density of the spacers, the point-shaped spacers 102b may also be arranged in the gaps between the strip-shaped spacers 102a, plane dimensions of the point-shaped spacers 102b are smaller than those of the strip-shaped spacers 102a, and thus the point-shaped spacers 102b may be arranged at positions with small spaces.

In addition, in order to reduce the influence on the rubbing alignment technique, the strip-shaped spacers 102a arranged regularly may be adopted preferably. In the figure, circles represent the point-shaped spacers 102b, the shapes of the point-shaped spacers 102b are not limited, and in specific embodiment, the point-shaped spacers 102b may be in the shapes of circles, squares, triangles, etc.

Based on the same inventive concept, an embodiment of the present disclosure further provides a display device. The display device may be applied to a mobile phone, a tablet computer, a television, a display, a laptop, a digital photo frame, a navigator and any product or component with a display function. Since the principle for solving problems of the display device is similar to the above display panel, implementation of the display device may refer to implementation of the display panel, and repeated parts are omitted herein.

Figure 12:
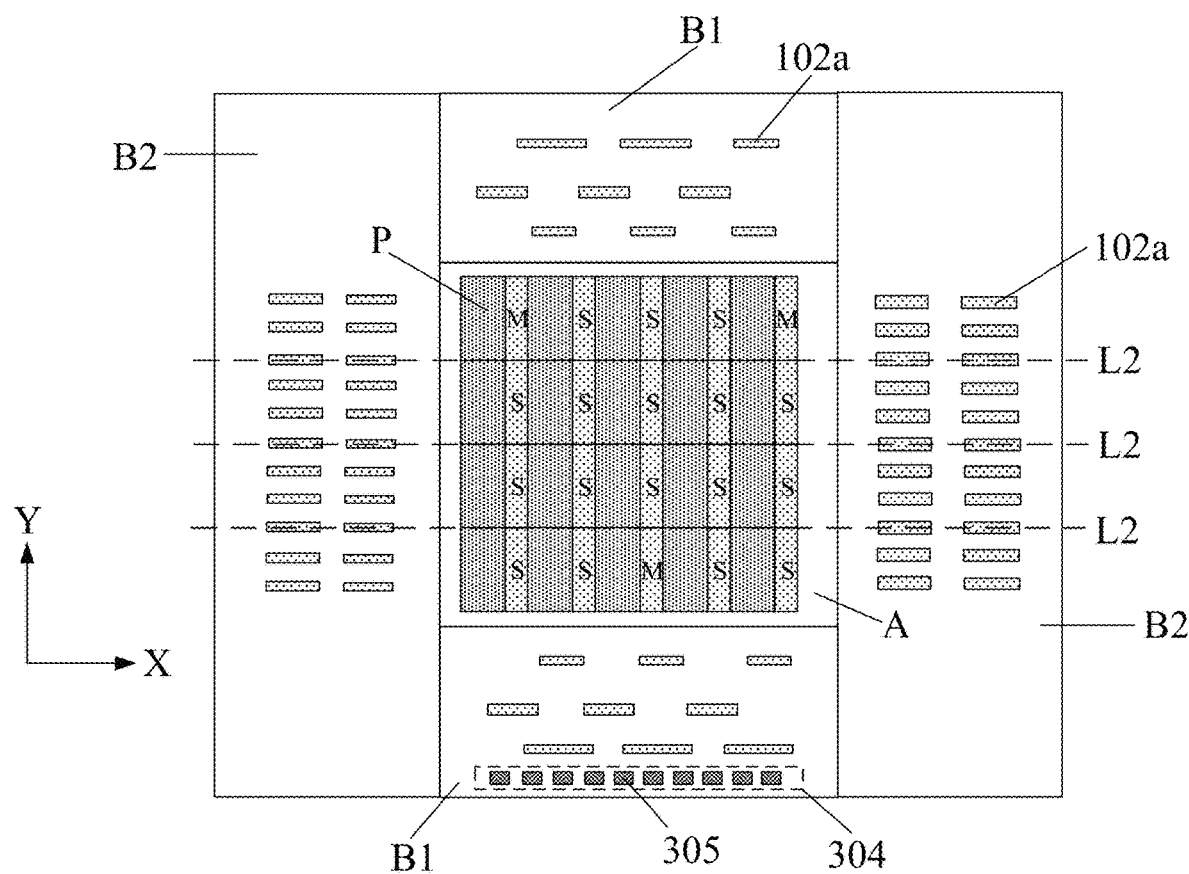
FIG. 12 illustrates a schematic structural diagram of a display device according to an embodiment of the present disclosure.

Specifically, referring to FIG. 12, the above display device according to the embodiment of the present disclosure includes: the above display panel and a backlight module located on one side of an incident surface of the display panel.

The backlight module includes a backlight source located on one side of the display device, that is, the backlight module is a laterally-incident backlight module. In FIG. 12, a backlight source 304 located in a first sub-region B1 includes a plurality of light sources 305. Specifically, the light sources 305 may be light emitting diode (LED) light sources. In addition, generally, the backlight module may further internally include a light guide plate. The backlight source in the backlight module may be arranged on one side of the light guide plate, and light rays of the backlight source may be emitted in a way of an area light source through the light guide plate, so that a light source is provided for the display panel.

In practical application, in order to avoid the situation that the light rays emitted by the backlight source 304 penetrate through a non-display region and are conducted into positions of edges of a display region, such that light leaks from the positions of the edges of the display region, underlaying structure may have at least two following arrangement manners.

Manner 1.

Referring to FIG. 5 and FIG. 6 at the same time, the underlaying structure corresponding to the side where the backlight source is located includes at least two laminated color resistor structures, since the color resistor structures are located on the same layer and made of the same material with a color light filter layer in the display region, the color resistor structures also have a light filter effect and may weaken light intensity of the light rays penetrating through the color resistor structures, and the color resistor structures may further weaken the light intensity of the light rays penetrating through the underlaying structure after being laminated, or may completely absorb the light rays emitted to the underlaying structure to relieve a light leakage phenomenon.

The underlaying structure shown in FIG. 5 includes a color resistor structure 101a, a color resistor structure 101b and a color resistor structure 101c which are laminated, and since the color resistor structures 101a, 101b and 101c are respectively located on the same layer and made of the same material with sub-pixel color resistors in red, sub-pixel color resistors in blue and sub-pixel color resistors in green, after the light rays emitted to the underlaying structure penetrate through the color resistor structure 101c, only green light rays can be emitted, and red and blue light rays will be absorbed by the color resistor structure 101a. The green light rays penetrate through the color resistor structure 101c and then are emitted to the color resistor structure 101b, only the blue light rays can penetrate through the color resistor structure 101b, so the light rays cannot penetrate through the color resistor structure 101b, and the underlaying structure is made to play a shading effect. The shading principle of the underlaying structure in the display panel shown in FIG. 6 is similar to that of the FIG. 5, which is omitted herein.

Manner 2.

The underlaying structure corresponding to the side where the backlight source is located includes one color resistor structure. Similar to the shading principle in the manner 1, when the underlaying structure only includes one color resistor structure, since the color resistor structure has the light filter effect, the color resistor structure may weaken the light intensity of the light rays penetrating through the color resistor structure.

Specifically, because eyes of people are relatively sensitive to green light, the color resistor structure in the underlaying structure may be arranged to be located on the same layer and made of the same material with sub-pixel color resistors in red or in blue, and thus the color resistor structure may remove green light rays by filtering to achieve the effect of relieving light leakage.

In the display panel and the display device according to the embodiments of the present disclosure, the underlaying structure and the supporting structure are arranged in the non-display region on at least one side of the display region, and the underlaying structure can underlay the supporting structure, so that the supporting capacity at the non-display region of the display panel is improved, the external force impact resistance at the non-display region of the display panel is improved, and the light leakage phenomenon at the edges of the display region is reduced. In addition, since the color resistor structures are located on the same layer and made of the same material with the color light filter layer in the display region, the color resistor structures also have the light filter effect and may weaken the light intensity of the light rays penetrating through the color resistor structures, and the color resistor structures may further weaken the light intensity of the light rays penetrating through the underlaying structure after being laminated, or may completely absorb the light rays emitted to the underlaying structure to relieve the light leakage phenomenon.

Although the preferred embodiments of the disclosure have been described, those skilled in the art can make additional changes and modifications on these embodiments once they know the basic creative concept. So the appended claims are intended to comprise the preferred embodiments and all changes and modifications that fall into the scope of the disclosure.

Apparently, those skilled in the art can perform various changes and modifications on the embodiments of the disclosure without departing from the spirit and scope of the embodiments of the disclosure. Therefore, if these changes and modifications on the embodiments of the disclosure fall in the scope of the claims of the disclosure and their equivalent technologies, the disclosure is intended to comprise these changes and modifications.

What is claimed is:

1. A display panel, comprising:
    a first substrate;
    at least one underlaying structure, arranged on the first substrate and in a non-display region of at least one side of a display region of the display panel; and
    at least one supporting structure, arranged on one side, facing away from the first substrate, of the at least one underlaying structure,
    wherein an orthographic projection of the supporting structure on the first substrate is within a range of an orthographic projection of the underlaying structure on the first substrate;
    wherein the display panel further comprises: a color light filter layer arranged in the display region, and a plurality of spacers arranged on one side, facing away from the first substrate, of the color light filter layer;
    wherein the plurality of spacers are divided into a plurality of main spacers and a plurality of sub-spacers;
    wherein the non-display region is divided into two first sub-regions arranged on two sides of the display region in the first direction, and two second sub-regions arranged on two sides of the display region in the second direction; the second direction is perpendicular to the first direction; and each of the first sub-regions comprises the underlaying structure;
    in each of the first sub-regions, the underlaying structure comprises the color resistor structures in three colors; and
    in the underlaying structure of each of the first sub-regions, the color resistor structures are arranged in one row in the second direction, and the color resistor structures in three colors are alternately arranged;
    wherein a contact density of the supporting structure in the first sub-regions is greater than 10,000 μm²/mm²; a contact density of the supporting structure in the second sub-regions is greater than 5,000 μm²/mm²; and a compression amount of the supporting structure is within a range of 0.1 to 0.3 μm;
    wherein the supporting structure comprises strip-shaped spacers;
    wherein gaps between the plurality of pixel units in the second direction are first gaps; in each of the second sub-regions, the strip-shaped spacers extend in the second direction and are arranged in an array; and orthographic projections of at least part of the strip-shaped spacers on a plane perpendicular to the second direction have overlapping regions with orthographic projections of the first gaps on the plane perpendicular to the second direction; wherein in each of the second sub-regions, a space between the strip-shaped spacer closest to the display region and the display region is greater than or equal to 0.5 mm; or
    in each of the second sub-regions, the strip-shaped spacers extend in the first direction; orthographic projections of the strip-shaped spacers arranged in a same second sub-region on a plane perpendicular to the second direction form a continuous figure; and in each of the second sub-regions, the farther from the display region, the longer the strip-shaped spacers in the first direction; wherein in each of the second sub-regions, a space between the strip-shaped spacer closest to the display region and the display region is greater than or equal to 1.5 mm.

2. The display panel according to claim 1, wherein the color light filter layer comprises sub-pixel color resistors in at least three colors;
    the underlaying structure comprises: color resistor structures arranged on a same layer and made of a same material as the sub-pixel color resistors in at least one color; and
    the supporting structure is arranged on a same layer and made of a same material as the spacers;
    wherein the display panel further comprises:
    a shading layer arranged between the underlaying structure and the first substrate, and a flat layer arranged on one side, facing away from the first substrate, of the underlaying structure.

3. The display panel according to claim 2, wherein a sum of a height of the supporting structure and a thickness of the underlaying structure is greater than a sum of a height of one of the main spacers and a thickness of the color light filter layer.

4. The display panel according to claim 2, further comprising: a second substrate arranged opposite to the first substrate;
    a plurality of pixel units arranged in the display region in an array; and
    a plurality of data lines arranged on one side, facing the first substrate, of the second substrate, extending in a first direction and arranged in a second direction;
    wherein each of the second sub-regions comprises the underlaying structure.

5. The display panel according to claim 4, wherein orthographic projections of the color resistor structures which belong to a same underlaying structure on the first substrate do not overlap.

6. The display panel according to claim 5, wherein in each of the second sub-regions, the underlaying structure comprises the color resistor structures in one color.

7. The display panel according to claim 6, wherein the color resistor structures and first sub-pixel color resistors are connected into an integrated structure; and
    the first sub-pixel color resistors are sub-pixel color resistors arranged on an edge of the display region, and the first sub-pixel color resistors and the color resistor structures are adjacent and have a same color.

8. The display panel according to claim 5, wherein in each of the second sub-regions, the underlaying structure comprises the color resistor structures in three colors; and in the underlaying structure of each of the second sub-regions, the color resistor structures are arranged in one row in the second direction, and the color resistor structures in three colors are alternately arranged.

9. The display panel according to claim 4, wherein an end surface of one side, facing away from the first substrate, of the supporting structure is in contact with a surface of one side, facing the first substrate, of the second substrate.

10. The display panel according to claim 9, wherein the non-display region further comprises: a metal layer arranged on one side, facing the first substrate, of the second substrate; and
an orthographic projection of the supporting structure on the second substrate is within a range of an orthographic projection of the metal layer on the second substrate.

11. The display panel according to claim 9, wherein the non-display region further comprises: a frame sealant arranged between the first substrate and the second substrate;
the frame sealant is arranged at an edge of the display panel;
the underlaying structure is arranged between the frame sealant and the display region, and a space exists between the underlaying structure and the frame sealant; and
the space between the underlaying structure and the frame sealant is greater than a sum of position precision of the frame sealant and diffusion precision of the frame sealant as well as position precision of the underlaying structure.

12. The display panel according to claim 9, wherein in each of the first sub-regions, the strip-shaped spacers extend in the second direction;
orthographic projections of the strip-shaped spacers arranged in a same first sub-region on a plane perpendicular to the first direction form a continuous figure; and
in each of the first sub-regions, the farther from the display region, the longer the strip-shaped spacers in the second direction;
wherein in each of the first sub-regions, a space between the strip-shaped spacer closest to the display region and the display region is greater than or equal to 1.5 mm.

13. The display panel according to claim 9, wherein the supporting structure further comprises: point-shaped spacers; and
the point-shaped spacers are distributed in gaps between the strip-shaped spacers.

14. A display device, comprising: the display panel according to claim 1 and a backlight module arranged on one side of an incident surface of the display panel,
wherein, the backlight module comprises a backlight source arranged on one side of the display device;
an underlaying structure corresponding to a side where the backlight source is arranged comprises at least two laminated color resistor structures;
or,
the underlaying structure corresponding to a side where the backlight source is arranged comprises one color resistor structure.

* * * * *